UNITED STATES PATENT OFFICE.

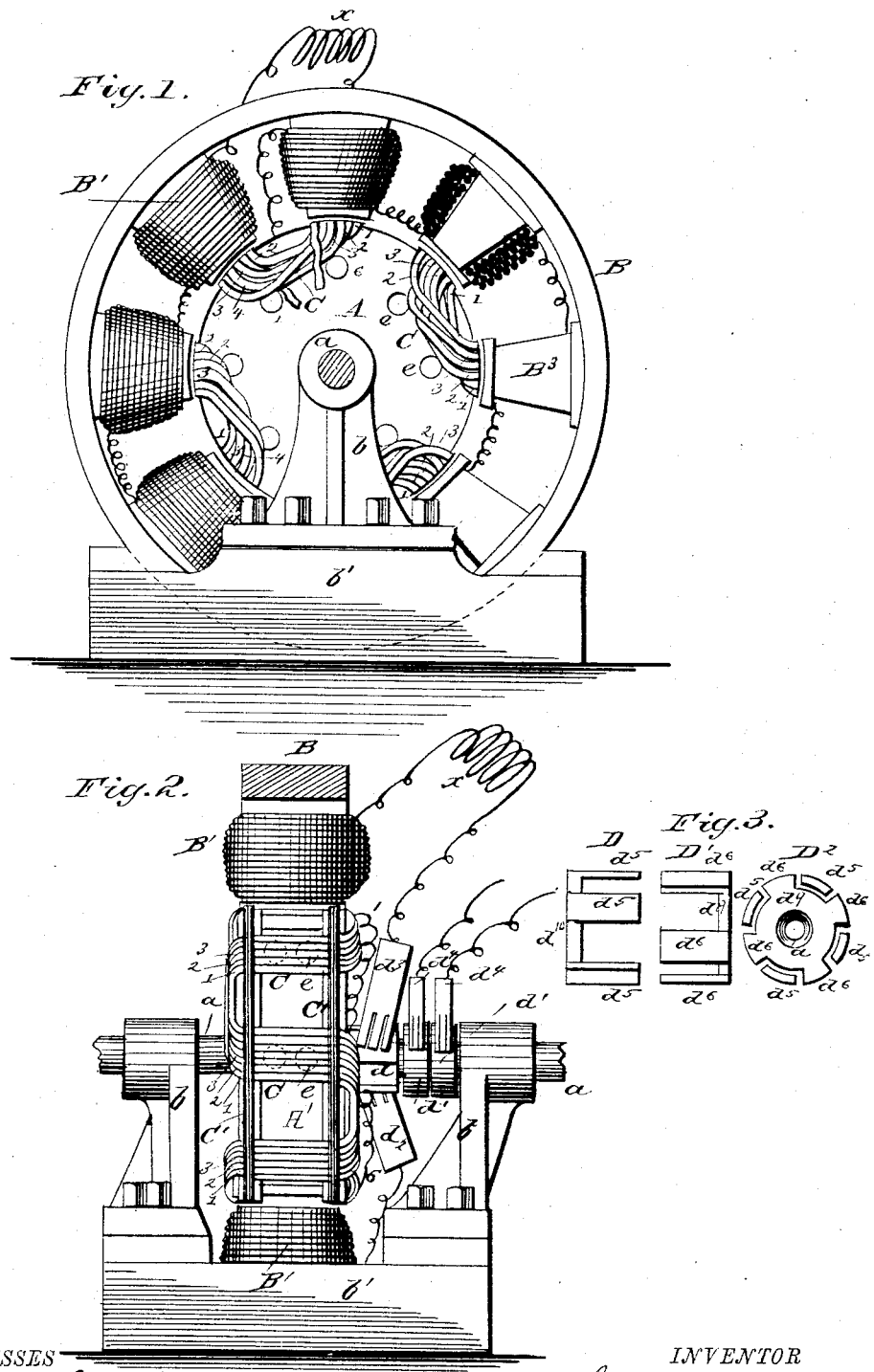

JOHN E. GILES, OF HAZLETON, PENNSYLVANIA.

DYNAMO OR MAGNETO ELECTRIC MACHINE.

SPECIFICATION forming part of Letters Patent No. 287,661, dated October 30, 1883.

Application filed March 3, 1883. (No model.)

*To all whom it may concern:*

Be it known that I, JOHN EDWIN GILES, a citizen of the United States, residing at Hazleton, in the county of Luzerne and State of Pennsylvania, have invented certain new and useful Improvements in Dynamo or Electric Magnetic Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to dynamo or magneto electric machines.

Heretofore in dynamo and magneto electric machines of large size the armatures have been of great weight, and by their construction necessitated great length and weight of inductive wires or bars in order to obtain the required intensity of current or electro-motive force to light on a large scale, either by arc or incandescence. Thus great loss of power was produced by unnecessary friction, and a reduced utilizable current resulting from resistance to the current in the use of long inductive wires, and, further, an even greater loss of current from induced or "Faucault" currents taken up by the large iron armatures.

The object of my invention is to render the construction of dynamo or magneto electric machines more simple, and to avoid induced currents in the armature-core and detrimental heat in the inductive conductors, and also to produce a high electro-motive force with the least resistance and shortest inductive conductor possible.

In the accompanying drawings, Figure 1 is a side elevation of my improvement. Fig. 2 is a front view of the same, with a part of the iron ring and electro-magnets removed. Fig. 3 is the commutator removed from its place on the shaft of the machine.

A is the armature, built of wood or other non-conductive material, and grooved at A' for the purpose of allowing a free circulation of air beneath the inductive wires.

$e\ e\ e$ are perforations for the circulation of air and for cooling the inductive bars or strips.

$a$ is a shaft, to which the armature A is securely fastened.

B is an iron ring, to which magnet-cores $B^3$ are either cast or secured by bolts.

$b\ b$ are upright bearings for the shaft $a$.

$b'$ is a base or bed plate, to which the ring B and uprights $b\ b$ are secured.

C C C are inductive wires, bars, or strips laid across the periphery of the armature A either singly or in one or more layers. The method of laying the inductive wires will be explained hereinafter.

$d'\ d'$ are metal ferrules, one or both insulated from the shaft $a$, to which they are secured, and used only when alternating currents are required external to the machine.

$d^4\ d^4$ are current-collectors to take the current from $d'\ d'$.

$d$ is a commutator, of which Fig. 3 is an enlarged and detailed view.

$d^2\ d^3$ are collectors for taking off the current direct, to feed the inducing-magnets B' B', thus making the machine self-sustaining, or to supply a direct current external to the machine, or both.

The commutator $d$ is formed in two parts, D D', which in the drawings are separated. When closed together $d^6$ will fill the space $d^5$, and $d^5$ the space $d^6$, as shown at $D^2$. Bars $d^6$ $d^6$ $d^6$ $d^6$ are electrically connected to end plates, $d^7$, and similar bars, $d^5$ $d^5$ $d^5$ $d^5$, are connected to the plate $d^{10}$. The parts D and D' are insulated from each other, and both are insulated from the shaft $a$.

The coil X serves to bring the resistance of the field-magnet circuit up to its proper magnitude with respect to the external circuit, and prevent the burning out of the field-magnet coils, and also send the proper proportion of current to the line.

The operation of the whole is as follows: The resident magnetism of the magnets will generate a weak current in inductive wires C C C, the terminals of which are 1 and 6, both connected to the commutator $d$. This current leaves, say, at 1 and enters at 6. The wire beginning at 1 is laid across the face of the armature. It is then brought back and forms 1 of the second cluster. It is again taken across and forms 1 of the third cluster, and so on until each cluster has the first wire all marked 1. It is then continued across the cluster containing the terminal 1, and it then constitutes 2. It is then brought back in the second cluster and marked 2, and is thus continued on and marked 2 2 2. It is again continued on and marked 3 3 3, and so on until, as shown in this case, the sixth convolution is in place, terminating at 6. I do not confine myself to this number of convolutions. The number from one up will depend upon the requirements of the machine. 1 and 6 are connected to the commutator $d$. Thus the current generated in one completes the entire circuit of the armature through 1 1 1 1 1 1 1 1, then making an entire second circuit through 2 2 2 2 2 2 2, thence a third circuit through 3 3 3 3 3 3 3, and so on, in this case making six circuits around the armature, and, leaving at C, is collected at the brush $d^2$, passing through magnet-coils B' B', resistance-coil $x$, brush $d^3$, making a complete closed circuit. Should a direct current for use outside of the machine be required, the terminals of such conductor are connected to brushes $d^2$ $d^3$, making the coils of B' B' $x$ a shunted circuit. Should an alternating current be required, D is put in electrical communication with one of the ferrules $d'$ and D' with the other ferrule $d$, thus giving outside an alternating current, and, to supply its own inductors, a direct one.

C' C' are binding-wires for securing inductive wires C C C to the armature.

A further object of my invention is to subject all the active part of the inductive wires to the same speed while passing through a magnetic field—a vital feature heretofore unobtained in machines of high electro-motive force.

My drawings show eight inducing-magnets and eight series of inductive conductors; but I do not limit my invention to any number. In practice it may be necessary, perhaps, to use many more. The magnets B' B' alternate in polarity.

Having fully described my invention, what I claim as new, and desire to secure by Letters Patent, is—

1. An armature for dynamo-electric machines, consisting of a disk of wood or other non-conducting and non-magnetic material, with inductive wires, bars, or strips laid on the periphery parallel to the axis of the same, and retained in position by means of binding-wires running around the periphery of the disk, substantially as shown and described.

2. The combination, in an armature for dynamo-electric machines, of a circular disk of non-magnetic and non-conducting material, having a groove in the periphery thereof, and transverse perforations through the body of the same, and inductive wires arranged around said periphery transverse to said peripheral groove, and retained in position by means of peripheral binding-wires, substantially as set forth.

3. The combination, in an armature for dynamo-electric machines, of a disk of non-magnetic and non-conducting material, having a groove in the periphery thereof, inductive wires arranged around said periphery transverse to said peripheral groove, and retained in position by means of peripheral binding-wires, and transverse perforations in the disk below the inductive coils or wires, substantially as and for the purpose set forth.

In testimony whereof I affix my signature in presence of two witnesses.

JOHN E. GILES.

Witnesses:
G. F. KISNER,
W. F. MARTZ.